(12) United States Patent
Bohner et al.

(10) Patent No.: US 9,938,613 B2
(45) Date of Patent: *Apr. 10, 2018

(54) METHOD FOR PRODUCING A MOTOR VEHICLE COMPONENT FROM ALUMINUM

(71) Applicant: Benteler Automobiltechnik GmbH, Paderborn (DE)

(72) Inventors: Friedrich Bohner, Oerlinghausen (DE); Jochen Doerr, Bad Driburg (DE); Jochem Grewe, Salzkotten (DE); Christian Hielscher, Delbrueck (DE); Joern Toelle, Paderborn (DE); Boris Rauscher, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 297 days.

This patent is subject to a terminal disclaimer.

(21) Appl. No.: 14/683,896

(22) Filed: Apr. 10, 2015

(65) Prior Publication Data

US 2015/0354043 A1 Dec. 10, 2015

(30) Foreign Application Priority Data

Jun. 10, 2014 (DE) .................. 10 2014 108 114

(51) Int. Cl.
*C22F 1/047* (2006.01)
*C22C 21/08* (2006.01)
*B62D 29/00* (2006.01)

(52) U.S. Cl.
CPC ............ *C22F 1/047* (2013.01); *B62D 29/008* (2013.01); *C22C 21/08* (2013.01)

(58) Field of Classification Search
CPC .... B62D 29/008; B21D 22/022; B21D 53/88; C22C 21/08; C22F 1/047
See application file for complete search history.

(56) References Cited

U.S. PATENT DOCUMENTS 6,550,302 B1 4/2003 Ghosh
8,211,251 B2 7/2012 Carsley et al.
(Continued)

FOREIGN PATENT DOCUMENTS

CN 102886457 A 1/2013
CN 103052732 A 4/2013
(Continued)

OTHER PUBLICATIONS

Chinese Office Action, Application No. 201510380976.0, dated Jun. 23, 2017, 19 pages.
(Continued)

*Primary Examiner* — Veronica F Faison
(74) *Attorney, Agent, or Firm* — Hauptman Ham, LLP

(57) ABSTRACT

A method for producing a motor vehicle component is disclosed having the steps of providing a strain-hardened blank composed of a 5000 grade aluminum alloy, partially heating the blank in a first region to a temperature higher than 350° C., in particular to 400° C., the blank being kept at a temperature between 15° C. and 30° C., preferably at 20° C., in a second region, and the partial heating being performed in less than 20 s, preferably less than 10 s and in particular in 2 to 5 s, adjusting the temperature of the blank as a whole to between 150 and 350° C. in less than 20 s, preferably less than 10 s and in particular in 2 to 5 s, and deforming the blank to form the motor vehicle component in less than 20 s, preferably less than 10 s and in particular in 2 to 5 s, and cooling the motor vehicle component.

32 Claims, 3 Drawing Sheets

(56) References Cited

U.S. PATENT DOCUMENTS

Figure 1A:
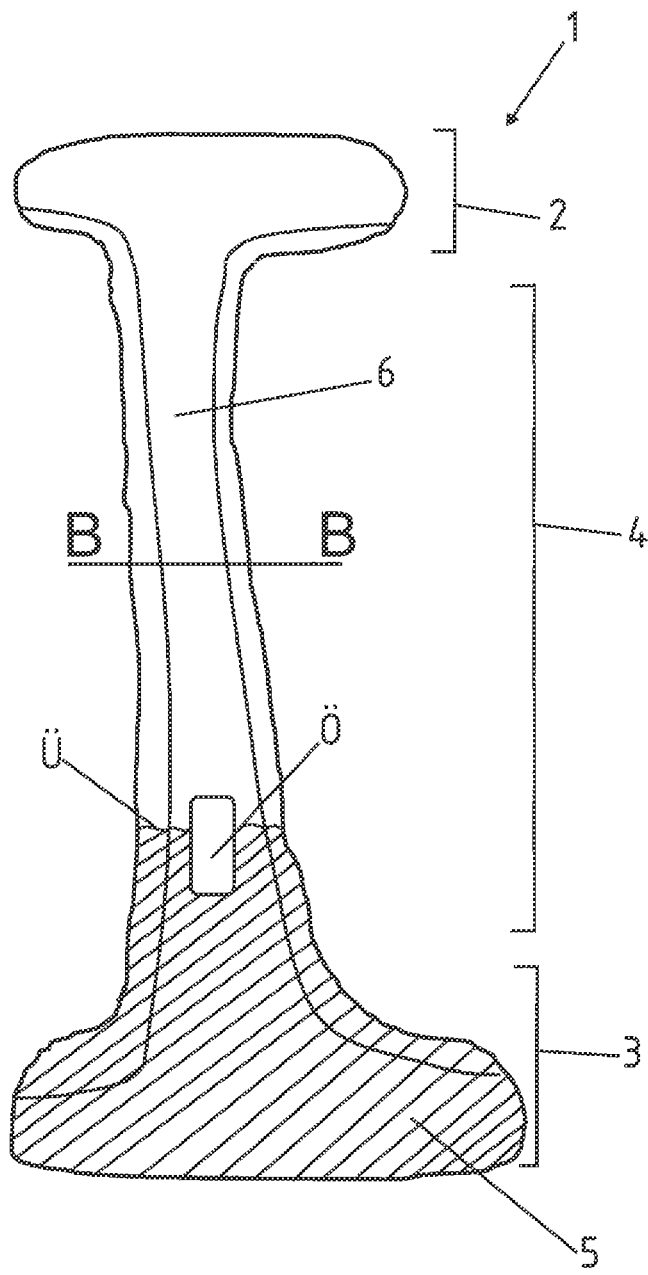

| | | | |
|---|---|---|---|
| 8,486,206 B2 | 7/2013 | Litalien et al. | |
| 2010/0218860 A1* | 9/2010 | Dorr | C21D 1/34 148/695 |
| 2011/0036472 A1* | 2/2011 | Carsley | C22C 21/08 148/698 |
| 2012/0273098 A1* | 11/2012 | Bohner | C22C 21/06 148/695 |
| 2013/0020000 A1* | 1/2013 | Carter | C21D 9/48 148/714 |
| 2013/0127197 A1* | 5/2013 | Diersmann | B21D 22/00 296/1.08 |
| 2015/0353146 A1* | 12/2015 | Bohner | C21D 9/46 148/240 |
| 2016/0339497 A1* | 11/2016 | Sachdev | B21D 22/022 |

FOREIGN PATENT DOCUMENTS

| | | |
|---|---|---|
| CN | 103421943 A | 12/2013 |
| DE | 102009008282 A1 | 8/2010 |
| DE | 102010033864 A1 | 4/2011 |
| DE | 102012212489 A1 | 1/2013 |
| EP | 2 415 895 A1 | 2/2012 |
| EP | 2415895 A1 | 2/2012 |
| JP | 2009-148823 A | 7/2009 |

OTHER PUBLICATIONS

Harrison, Nia R. et al.,"Optimization of High-Volume Warm Forming for Lightweight Sheet", SAE Technical Paper Series, Apr. 8, 2013, pp. 1-11.

Billur, E. et al., "R&D Update: Warm forming of alloys in the auto industry", Stamping Journal, Jun. 28, 2013 (Jun. 28, 2013), pp. 1-8.

Office Action issued in Chinese Application No. 201510380976.0 dated Nov. 4, 2016.

* cited by examiner

B-B

C-C

METHOD FOR PRODUCING A MOTOR VEHICLE COMPONENT FROM ALUMINUM

RELATED APPLICATIONS

This application claims the benefit of German Application No. 10 2014 108 114.5, filed Jun. 10, 2014, which is incorporated herein by reference in its entirety.

The present invention relates to a method for producing a motor vehicle component as per the features in the preamble of patent claim 1.

It is known from the prior art for vehicle components and motor vehicle structural components to be produced from metallic materials. Here, a self-supporting motor vehicle body has imparted to it the rigidity required for normal vehicle operation. In recent years, however, the demands on motor vehicle bodies of said type have greatly increased. The focus is no longer just on styling, but is at the same time also on the targeted generation of characteristics in the event of a vehicle crash, and on consistent lightweight design.

In this regard, it is known from the prior art to use steel materials with which it is possible to provide components with high-strength or even ultra high-strength characteristics. Said high-strength or ultra high-strength characteristics are produced in targeted fashion in parts of the components.

It is alternatively known to produce motor vehicle components from aluminum. In this case, aluminum is used as a lightweight metal component and, owing to its low inherent specific weight, permits a corresponding weight saving. The production of the aluminum component for motor vehicles is known for example from DE 10 2009 008 282 A1.

It is an object of the present invention, taking the prior art as a starting point, to specify a method for producing a motor vehicle component from a light metal alloy, by means of which method it is possible in an economical and inexpensive manner to produce a motor vehicle component with regions of mutually different strength.

The above-stated object is achieved by means of a method according to the features in patent claim 1.

Advantageous design variants of the method will emerge from the dependent patent claims.

The method according to the invention for producing a motor vehicle component, in particular a vehicle pillar, is characterized by the following method steps:
- providing a strain-hardened blank composed of a 5000 grade aluminum alloy,
- partially heating the blank in at least one first region to a temperature higher than 350° C., in particular to 400° C., the blank being kept at a temperature between 15° C. and 30° C., preferably at 20° C., in at least one second region, and the partial heating being performed in less than 20 s, preferably less than 10 s and in particular in 2 to 5 s,
- adjusting the temperature of the blank as a whole to between 150 and 350° C., in particular 300° C., in less than 20 s, preferably less than 10 s and in particular in 2 to 5 s,
- deforming the blank to form the motor vehicle component in less than 20 s, preferably less than 10 s and in particular in 2 to 5 s, and cooling the motor vehicle component,
- generating a yield strength in the first region of less than 250 MPa and greater than 120 MPa and a yield strength in the second region of less than or equal to 450 MPa and greater than 200 MPa, wherein the yield strength of the second region is lower than the initial yield strength of the blank, but at least more than 50 MPa, preferably more than 100 MPa greater than the yield strength of the first region.

Firstly, a naturally hard blank, and/or a strain-hardened blank, composed of a 5000 grade aluminum alloy is provided, which has dislocations in the crystal lattice and thus has a yield strength of between 400 MPa and 500 MPa, this also being referred to as initial yield strength. The blank is partially heated in at least one first region. An at least second region then remains at the initial temperature, which preferably constitutes room temperature, in particular between 10° C. and 30° C. In the context of the invention, heating or concomitant heating in the range of a few degrees Celsius that may occur in the one or more second regions, for example heating to 40° C. or 50° C. in the edge region, can in this case be disregarded. Owing to the partial heating in the first region, softening of the material microstructure occurs, wherein the temperature and/or the time of the heating are/is selected in a manner dependent on the strength and ductility to be attained. The yield strength is the RP 0.2 yield strength.

After the partial heating of the blank in a first region, the blank as a whole is adjusted homogeneously to a temperature between 150° C. and 350° C., preferably to 300° C. The blank that has been subjected to temperature adjustment in this way then exhibits very good forming characteristics and, owing to the prior partial heating, mutually different strength characteristics. The blank that has been homogeneously adjusted to the above-stated temperature is then processed further, by forming, to form the motor vehicle component, and is subsequently cooled.

In the context of the invention, it is now preferably possible for a combined temperature adjustment, forming and cooling tool to be used. This means that the temperature adjustment to a homogeneous temperature, the forming and the subsequent cooling are performed in a combination tool.

It is however preferable for the temperature adjustment to be performed in a separate temperature adjustment tool, wherein then, the temperature adjustment tool may in turn be followed by a combined forming and cooling tool, or else by a forming tool (deformation tool) and by a cooling tool that is separate therefrom.

In particular, the heating and/or temperature adjustment is performed by way of an areal temperature adjustment tool by abutting contact, which permits a reduction in production outlay on the manufacturing line, and increased precision in the setting of the temperature.

It is furthermore particularly preferable for the forming to be performed in a press-type forming tool (deformation tool), and for the cooling to be performed, in the case of a combined forming and pressing tool, in a coolable forming tool. The cooling may alternatively also be performed by way of contact in a separate cooling tool. It is likewise possible for the cooling to take place in a dip tank, such that the motor vehicle component as a whole is immersed. In this case, the cooling may also be performed in a first and a second cooling process, with cooling to a temperature between 120 and 200° C. being performed in the first cooling process. Then, in the second cooling process, cooling to room temperature is preferably performed, wherein the second cooling process is performed in less than 20 s, in particular less than 10 s and very particularly preferably in less than 2.2 s to 5 s, in exactly the same way as the first cooling process. The first and second cooling processes may be performed in one cooling tool, though may in particular be performed in two mutually separate cooling tools. The first and second cooling processes may in this case be performed in direct succession in terms of time, though it is also possible for at least a transfer time from one cooling tool into a second cooling tool, and/or a predefined waiting time between the first and second cooling processes, to be incorporated.

It is particularly preferable for each individual one of the abovementioned method steps to be performed in a time of less than 20 s, preferably less than 10 s and in particular in 2 s to 5 s. Furthermore, any intermediate transfers are particularly preferably likewise performed in less than 10 s, very particularly preferably in less than 5 s.

In the context of the invention, use is preferably made of an aluminum alloy with the designation AW/AA5xxx-Hxx. This is preferably a strain-hardened aluminum alloy which has been correspondingly strain-hardened in particular by way of a prior rolling process, and which may optionally have been subjected to thermal aftertreatment in intermediate steps or subsequently. This refers in particular to a cold-rolling process prior to the heating according to the invention. The cold rolling causes dislocations to be formed in the crystal lattice, such that the strain-hardened aluminum alloy has an initial yield strength of between 200 MPa and 450 MPa preferably up to 500 MPa, in particular 300 MPa to 450 MPa. The strength state can be verified on the strain-hardened starting material, or else on a motor vehicle component produced therefrom, by way of a tensile test. In particular, an aluminum alloy conforming to the European standard EN515:1993 in the material state H12, H14, H16, H18, H19, H22, H24, H26, H28, H32, H34, H36 or H38 is processed, this having, as alloy elements aside from aluminum, at least magnesium and possibly manganese and further alloy elements.

In particular, with all method variants, strengths between 250 MPa and 120 MPa are generated in a first region, and strengths between 450 MPa and 200 MPa are generated in the second region. Consequently, a relatively hard region, and a region which is softer or more ductile than the former region, are generated in the blank and then indirectly in the motor vehicle component produced further downstream, or in the case of direct production of the motor vehicle component, said regions are generated in said motor vehicle component directly.

It is furthermore particularly preferable for the blank to undergo final trimming before, during or after the forming. It is then hereby possible for the external component contour to be defined.

In a particularly preferred design variant, a blank having at least two mutually different wall thicknesses is deformed. In particular, use is made here of a tailored material, wherein the different wall thicknesses are produced in particular by partial rolling during the cold-rolling process. This is known as a tailored rolled blank. In the context of the invention, it is however also possible for use to be made of a tailored welded blank, that is to say a blank in which two sheet-metal blank parts of different wall thickness have been thermally joined together. Friction stir welding is particularly suitable for this, though other cohesive coupling methods may also be used. In the context of the invention, it is however also possible for a patched blank to be used, such that a local component patch is applied to the blank. The blank is then deformed together with the component patch. In this case, the component patch is in particular adhesively bonded to the blank and fixed in position by mechanical or thermal methods, for example clinching, riveting, friction stir welding or spot welding, wherein the adhesive can be thermally activated and, when the blank is heated to forming temperature, is correspondingly adhesively bonded together with the blank.

With regard to the generation of the yield strength in the finished motor vehicle component, the values relate in each case to the main blank, that is to say to the larger of the blanks, to which at least one patch blank has been applied.

As material for the patch blank, use may be made of the same aluminum alloy as for the main blank. In this case, the initial, shipped state, or the thermal treatment, of the patch blank should be selected such that, during the forming, at least the deformability of the corresponding region of the main blank is attained. The same however also applies in the case of a different patch material being used.

It is particularly preferable, in the case of the tailored material, for a blank with thickness variations between 1 mm and 10 mm, in particular from 2 mm to 6 mm wall thickness, to be deformed. The blank may then have greater wall thicknesses at least in parts, wherein the greater wall thicknesses are between 1 mm and 15 mm, in particular between 3 mm and 12 mm and very particularly preferably between 3.5 mm and 10 mm, and are in particular up to 3 mm thicker than the other regions of the blank.

In particular, with the method according to the invention, a motor vehicle component composed of an aluminum alloy is produced which, in the event of a collision, is intended to locally undergo a forming which is predefined in terms of its configuration, wherein the motor vehicle component may furthermore be joined to further reinforcement parts. The reinforcement parts may also be produced in accordance with the method according to the invention. The reinforcement parts themselves are joined to the motor vehicle component after the completion of the forming process. Said reinforcement parts constitute in particular an inner reinforcement and/or an outer reinforcement. The inner reinforcement may for example be applied in the form of a patch to the motor vehicle component that has been produced. In the context of the invention, it is however also possible for a corresponding hollow component to be produced by way of the coupling to the inner reinforcement and/or to the outer reinforcement. The reinforcements are in particular also aluminum components. The reinforcement may however also be in the form of a steel component, or applied in the form of a fiber composite material. It is particularly preferable for the reinforcement to be adhesively bonded to the motor vehicle component. The adhesive bonding is in particular combined with a thermal or mechanical joining process in order to hold the reinforcement in position during the hardening process. In the context of the invention, it is however also possible for the two components to be thermally joined to one another. Positively locking coupling methods such as riveting, in particular punch riveting, or a clinching process are also possible.

Here, in the context of the invention, the cooling tool may be a flat cooling tool which effects cooling by way of abutting contact. In the context of the invention, it is however also possible, for example, for the cooling tool to be in the form of a dip tank, such that the temperature-adjusted blank as a whole, and/or the motor vehicle component that has been produced with temperature adjustment and deformed, are immersed in the dip tank and thus cooled. Use is however particularly preferably made of a combined cooling and defamation tool in order to attain the best possible component precision and economic efficiency.

In the context of the invention, however, it is basically always the case in all design variants that the blank as a whole, and/or the motor vehicle component as a whole, are/is completely cooled.

In the context of the invention, the blank or the component is furthermore particularly preferably subjected to surface treatment. This is to be understood in particular to mean a coating process, very particular preferably a conversion coating process. The surface treatment of the blank or of the component has an advantageous effect in particular on the further processing with regard to joining. Owing to the surface treatment, the blank or the component has defined, reproducible surface characteristics, by contrast to the inhomogenous and contaminated oxide layer that forms of its own accord under environmental influences. This has a positive effect in particular on all subsequent manufacturing processes which produce a connection to said surface, such as for example adhesive bonding or painting, or which, for stability of the process, require highly reproducible initial characteristics, such as for example arc welding.

In the context of the invention, to carry out the method, use is made in particular of a tool which has different sections, wherein the sections in the tool can assume mutually different temperatures with regard to heating or cooling. In this way, it is then possible to realize the different temperature gradients in the blank in those regions therein which are to be adjusted to different temperatures. The different sections in the forming and/or temperature adjustment tool may for example be realized by way of mutually independent temperature adjustment segments, which are in particular insulated with respect to one another. In this case, the cooling may be performed in the tool for partial heating, or may alternatively be performed in a separate cooling tool.

In the context of the invention, it is furthermore possible for an intermediate step to be incorporated after the partial heating of the blank and before the temperature adjustment. The intermediate step provides for the partially heated blank to initially be completely cooled. Said completely cooled blank may then in turn be subjected to temperature adjustment, in this case heating, immediately after the cooling process, or may alternatively be temporarily stored. The temporary storage may in this case be over a short period of time, for example of a few minutes to a few hours, though may also last several days, by virtue of the fact that the microstructure state of the blank does not change, or changes only negligibly, at room temperature. Temperature adjustment in the form of heating is then in turn performed after the temporary storage.

An alternative preferred design variant of the present invention provides for the partially heated blank to undergo temperature adjustment at a time immediately following the partial heating process, and to then be correspondingly completely heated, and/or cooled to the temperature-adjustment temperature in the partial region, for temperature adjustment purposes. The temperature adjustment may in this case be performed in the same tool as that used for the partial heating. Alternatively, the temperature adjustment may also be performed in a temperature adjustment tool that is separate from the partial heating tool.

In the context of the invention, a particular advantage is also optionally attained, such that whenever the subsequent process step can be performed separately in terms of time or location from the immediately preceding process step of blank heating, cooling in room air, without a time limit, is preferably implemented. In the event that distortion of the blank or an undesired heat flow from the relatively hot blank regions into the relatively cool blank regions occurs during said cooling process, rapid cooling in a special cooling station is also possible.

If the subsequent process step is performed separately in terms of time or location from the immediately preceding process step of heating of the blank, it is then possible according to the invention for the blanks thus produced to be stored for example in a storage facility, and retrieved as required.

Re-heating of the blanks that have already been subjected to partial thermal pre-treatment is subsequently performed in order to increase the deformability of the complete blank, in particular of the second region, such that the blank can subsequently be shaped in a forming tool to produce the desired motor vehicle component.

Figure 1B:
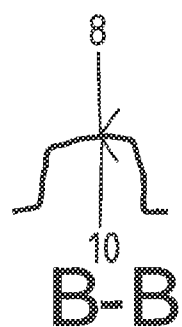
Figure 2A:
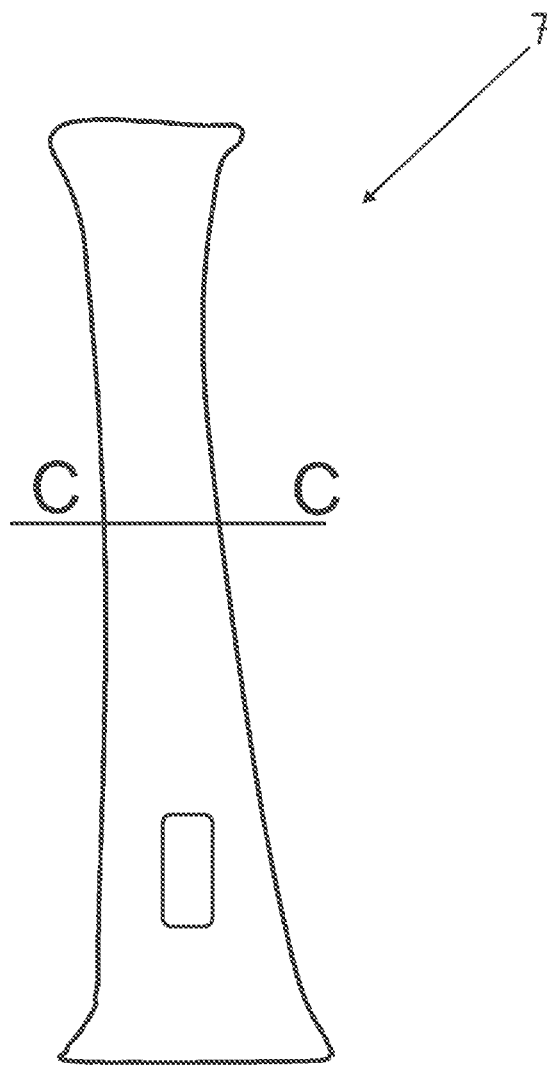
Figure 2B:

Further advantages, features, characteristics and aspects of the present invention will be discussed in the following description and illustrated in the schematic figures. Said figures serve to give a clearer understanding of the invention. In the figures:

FIGS. 1a and 1b show a side view and a cross-sectional view of a motor vehicle B pillar produced according to the invention, FIGS. 2a and 2b show an outer reinforcement panel for a motor vehicle B pillar as per FIG. 1, and FIGS. 3a to 3c show an inner reinforcement panel.

In the figures, the same reference signs are used for identical or similar components, even if a repeated description is omitted for simplicity.

FIG. 1a shows a motor vehicle component 1 according to the invention in the form of a B pillar, in a side view. The B pillar has a head region 2 for connection to a roof beam (not illustrated in any more detail) and a foot region 3 for connection to a side sill (not illustrated in any more detail). Between the head region 2 and the foot region 3 there extends a central section 4 with an opening Ö. According to the invention, it is now the case that the foot region 3 and a lower part of the central section 4 are formed as a first region 5 which, during the forming (deformation) process, is kept at the forming temperature, such that a relatively soft or relatively ductile microstructure, with preferably between 120 and 250 MPa, is generated here. The upper central section 4 and the head region 2 are in this case formed as a second region 6, which has harder characteristics than the first region 5 and has a yield strength of between 250 MPa and 450 MPa. The first region 5 and second region 6 are separated by a transition Ü which extends over 1 mm to 100 mm, preferably 15 mm to 50 mm. FIG. 1b shows a cross section as per the section line B-B, such that it can be seen that, during the forming process, at least the central section 4 has been formed in the manner of a hat-shaped profile in cross section. The component has thus been three-dimensionally shaped.

Furthermore, FIGS. 2a and b illustrate an outer reinforcement panel 7 in a side view and in a cross-sectional view. The outer reinforcement panel 7 has a substantially homogeneous cross-sectional profile and is, as per FIG. 2b, in the form of a U-shaped reinforcement panel. This is applied to the outer side 8, as per FIG. 1b, of the motor vehicle component 1, in particular by adhesive bonding, particularly preferably by way of an adhesive that can be thermally activated.

Figure 3A:
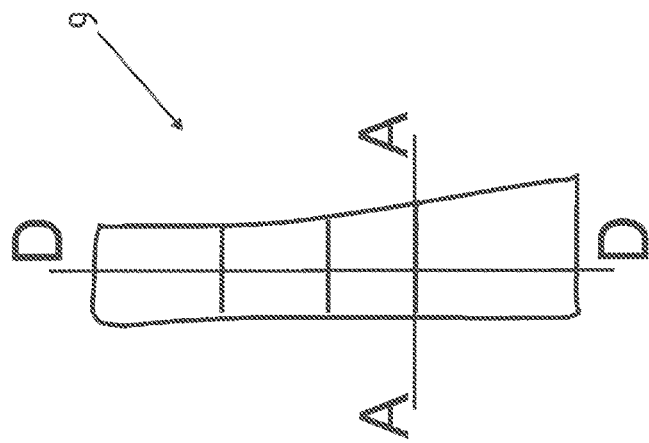
Figure 3C:
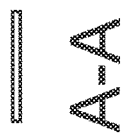
Figure 3B:
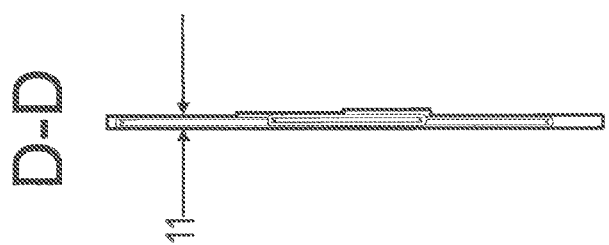

FIGS. 3a to c furthermore illustrate an inner reinforcement panel 9, which is illustrated in a side view in FIG. 3a, in a longitudinal section in FIG. 3b, and in a transverse section in FIG. 3c. The inner reinforcement panel 9 is applied to an inner side, as per FIG. 1b, of the B pillar. Along the longitudinal section line D-D, the inner reinforcement panel 9 has mutually different wall thicknesses 11 in parts over the longitudinal profile. The cross-sectional profile illustrated in FIG. 3c follows section line A-A, wherein said cross-sectional profile is of homogeneous and flat form. The inner reinforcement panel 9 is applied to the inner side 10 as per FIG. 1b, preferably by adhesive bonding.

The inner reinforcement panel is preferably produced from an aluminum alloy which has been extruded to form a profile, wherein different wall thicknesses are generated in the profile and, in a subsequent process step, the profile is trimmed longitudinally, optionally unwound into a flat form, and/or press-molded into its final shape.

REFERENCE SIGNS

1—Motor vehicle component
2—Head region
3—Foot region
4—Central section
5—First region
6—Second region
7—Outer reinforcement panel
8—Outer side of 1
9—Inner reinforcement panel
10—Inner side of 1
11—Wall thickness
Ö—Opening
Ü—Transition

The invention claimed is:

1. A method for producing a motor vehicle component, characterized by the following method steps:
providing a strain-hardened blank composed of a 5000 grade aluminum alloy,
partially heating the blank in a first region to a temperature higher than 350° C., the blank being kept at a temperature between 15° C. and 30° C. in a second region, and the partial heating being performed in less than 20 s,
adjusting the temperature of the blank as a whole to between 150 and 350° C. in less than 20 s,
deforming the blank to form the motor vehicle component in less than 20 s, and cooling the motor vehicle component,
generating a yield strength in the first region of less than 250 MPa and greater than 120 MPa, and a yield strength in the second region of less than 450 MPa and greater than 200 MPa.

2. The method as claimed in claim 1, wherein the temperature adjustment is performed in a forming tool.

3. The method as claimed in claim 1, wherein the cooling is performed in a forming tool, the cooling being performed during and/or after the forming.

4. The method as claimed in claim 1, wherein the forming and cooling are performed in a combined forming and cooling tool in less than 20 s.

5. The method as claimed in claim 1, wherein the temperature adjustment is performed in a temperature adjustment tool.

6. The method as claimed in claim 1, wherein the blank is trimmed before, during or after the forming.

7. The method as claimed in claim 1, wherein a blank having at least two mutually different wall thicknesses is deformed.

8. The method as claimed in claim 1, wherein the motor vehicle component is a motor vehicle pillar composed of aluminum is produced, the motor vehicle pillar being coupled to an inner reinforcement panel and/or an outer reinforcement panel.

9. The method as claimed in claim 1, wherein the cooling is performed by way of a first cooling process, cooling to a temperature between 120 and 200° C. being performed in the first cooling process, and the first cooling process is followed by a second cooling process, the second cooling process being performed in less than 20 s.

10. The method as claimed in claim 9, wherein the second cooling process is performed in a separate cooling tool.

11. The method as claimed in claim 1, wherein the blank is subjected to surface treatment.

12. The method as claimed in claim 1, wherein, after the partial heating and before the temperature adjustment of the blank as a whole, an intermediate step is performed, the intermediate step providing for the partially heated blank to be completely cooled.

13. The method as claimed in claim 1, wherein the temperature adjustment of the blank as a whole is performed at a time immediately following the partial heating, the temperature adjustment being performed in the same tool in which the partial heating is also performed, or the temperature adjustment being performed in a tool that is separate from the partial heating.

14. The method as claimed in claim 1, wherein said partially heating the blank in a first region to a temperature higher than 350° C. comprises partially heating to 400° C.

15. The method as claimed in claim 1, wherein the blank being kept at a temperature between 15° C. and 30° C. comprises the blank being kept at a temperature of 20° C.

16. The method as claimed in claim 1, wherein the partial heating being performed in less than 20 s comprises partial heating in less than 10 s.

17. The method as claimed in claim 1, wherein the partial heating being performed in less than 20 s comprises between 2 to 5 s.

18. The method as claimed in claim 1, wherein adjusting the temperature of the blank as a whole to between 150 and 350° C. comprises a temperature of 300° C.

19. The method as claimed in claim 1, wherein adjusting the temperature of the blank as a whole in less than 20 s comprises adjusting the temperature of the blank as a whole in less than 10 s.

20. The method as claimed in claim 1, wherein adjusting the temperature of the blank as a whole in less than 20 s entails between 2 to 5 s.

21. The method as claimed in claim 1, wherein deforming the blank to form the motor vehicle component in less than 20 s entails less than 10 s.

22. The method as claimed in claim 1, wherein deforming the blank to form the motor vehicle component in less than 20 s comprises between 2 to 5 s.

23. The method as claimed in claim 1, wherein the forming and cooling are performed in a combined forming and cooling tool in less than 10.

24. The method as claimed in claim 1, wherein the forming and cooling are performed in a combined forming and cooling tool in between 2 and 5 s.

25. The method as claimed in claim 1, wherein the temperature adjustment is performed in a temperature adjustment station.

26. The method as claimed in claim 8, wherein the motor vehicle pillar is adhesively bonded to an inner reinforcement panel and/or an outer reinforcement panel, and wherein the adhesive is thermally activatable.

27. The method as claimed in claim 9, wherein the cooling is performed by way of a second cooling process being performed in less than 10 s.

28. The method as claimed in claim 9, wherein the cooling is performed by way of a second cooling process being performed in less between 2 and 5 s.

29. The method as claimed in claim 9, wherein the cooling is performed by way of a second cooling process of cooling to room temperature.

30. The method as claimed in claim 1, wherein the blank is conversion coated.

31. The method as claimed in claim 1, further comprising an intermediate step of cooling the partially heated blank to a temperature between 5 and 40° C.

32. The method as claimed in claim 1, further comprising an intermediate step of cooling the partially heated blank to room temperature.

* * * * *